United States Patent
Zhao et al.

(10) Patent No.: US 11,780,452 B2
(45) Date of Patent: Oct. 10, 2023

(54) METHOD AND SYSTEM FOR FAULT DIAGNOSES OF INTELLIGENT VEHICLES

(71) Applicant: CHANG'AN UNIVERSITY, ShaanXi (CN)

(72) Inventors: Xiangmo Zhao, ShaanXi (CN); Haigen Min, ShaanXi (CN); Yukun Fang, ShaanXi (CN); Xia Wu, ShaanXi (CN); Zhigang Xu, ShaanXi (CN); Runmin Wang, ShaanXi (CN); Zhanwen Liu, ShaanXi (CN); Siyuan Gong, ShaanXi (CN); Yu Zhu, ShaanXi (CN); Wuqi Wang, ShaanXi (CN); Chaoyi Cheng, ShaanXi (CN); Pengpeng Sun, ShaanXi (CN); Zhen Wang, ShaanXi (CN); Yuande Jiang, ShaanXi (CN)

(73) Assignee: CHANG'AN UNIVERSITY, Xi'an (CN)

( * ) Notice: Subject to any disclaimer, the term of this patent is extended or adjusted under 35 U.S.C. 154(b) by 229 days.

(21) Appl. No.: 17/195,617

(22) Filed: Mar. 8, 2021

(65) Prior Publication Data
US 2022/0118987 A1    Apr. 21, 2022

(30) Foreign Application Priority Data
Oct. 21, 2020    (CN) .......................... 202011134946.9

(51) Int. Cl.
*B60W 50/02*    (2012.01)
*B60W 60/00*    (2020.01)
*G01S 19/20*    (2010.01)

(52) U.S. Cl.
CPC ...... *B60W 50/0205* (2013.01); *B60W 60/001* (2020.02); *G01S 19/20* (2013.01)

(58) Field of Classification Search
CPC .. B60W 50/0205; B60W 60/001; G01S 19/20
See application file for complete search history.

(56) References Cited

U.S. PATENT DOCUMENTS

| | | | |
|---|---|---|---|
| 8,356,207 B2* | 1/2013 | Hosek | G06F 11/008 714/48 |
| 2008/0004840 A1* | 1/2008 | Pattipatti | G05B 23/0251 702/183 |
| 2019/0340392 A1* | 11/2019 | Khorrami | G06F 21/57 |

FOREIGN PATENT DOCUMENTS

| | | |
|---|---|---|
| CN | 103455026 A | 12/2013 |
| CN | 110501169 A | 11/2019 |
| CN | 110658807 A | 1/2020 |

* cited by examiner

*Primary Examiner* — Hunter B Lonsberry
*Assistant Examiner* — Paysun Wu

(57) ABSTRACT

A model of a system of an intelligent vehicle is trained and optimized using system operation data of the intelligent vehicle in a normal running state. The system operation data of the intelligent vehicle in a running state is collected in real time. Sensor data of the system operation data is de-noised, and feature extraction and screening are performed for a fatal sensor fault to reconstruct the system operation data. The reconstructed system operation data is inputted into the trained model to output system state data of the intelligent vehicle in the running state. The system state data is compared with a set threshold. If the system state data exceeds the set threshold, an actuator corresponding to the system state data is determined to have a fault. In addition, a system for a fault diagnosis of the intelligent vehicle is further provided.

6 Claims, 4 Drawing Sheets

METHOD AND SYSTEM FOR FAULT DIAGNOSES OF INTELLIGENT VEHICLES

CROSS-REFERENCE TO RELATED APPLICATIONS

This application claims the benefit of priority from Chinese Patent Application No. 202011134946.9, filed on Oct. 21, 2020. The content of the aforementioned application, including any intervening amendments thereto, is incorporated herein by reference in its entirety.

TECHNICAL FIELD

The present application relates to fault diagnoses for systems, particularly to data analysis of sensors of intelligent vehicles, and more particularly to a method and a system for a fault diagnosis of an intelligent vehicle.

BACKGROUND

An intelligent vehicle involves high-tech technologies, such as sensor technologies, computer technologies, communication technologies, information processing technologies, and control technologies. The development of the intelligent vehicle is promising in the field of transportation. However, the safety of intelligent vehicles still cannot be guaranteed, and there is no systematic theory to ensure the safety of the intelligent vehicles. Thus, it is of great significance to provide a method for fault diagnoses of the intelligent vehicles to ensure the safety of the intelligent vehicles in practical use.

Existing fault diagnosis methods for intelligent vehicle are generally based on fault diagnosis methods applied in traditional industrial processes and mainly include model-based methods, signal-based methods, and data-driven methods. However, since the intelligent vehicle has a complex system, possible faults of various subsystems of the intelligent vehicle cannot be effectively diagnosed using a single fault diagnosis method. In addition, it is difficult to accurately position faults of subsystems of the intelligent vehicle through data of sensors carried by the intelligent vehicle.

SUMMARY OF THE DISCLOSURE

In order to overcome shortcomings in the prior art, the present disclosure aims to provide a method for a fault diagnosis of an intelligent vehicle.

Provided is a method for a fault diagnosis of an intelligent vehicle, comprising:

1) establishing a model of a system of the intelligent vehicle; acquiring system operation data of the intelligent vehicle in a normal running state; training and optimizing the model using the system operation data of the intelligent vehicle in a normal running state;

2) collecting the system operation data of the intelligent vehicle in a running state in real time; de-noising sensor data of the operation data, and performing feature extraction and screening for a fatal sensor fault to reconstruct the system operation data; if a screened feature is the fatal sensor fault, outputting sensor unit information corresponding to the screened feature; inputting the reconstructed system operation data into the trained model to output system state data of the intelligent vehicle in the running state; comparing the system state data with a set threshold; and if the system state data exceeds the set threshold, determining that an actuator corresponding to the system state data has a fault, thereby completing the fault diagnosis of the intelligent vehicle.

In some embodiments, the system operation data of the intelligent vehicle in the normal running state is obtained through a storage medium of a control system of the intelligent vehicle; and a useful field in the system operation data is extracted, and data cleaning and data transformation are carried out for the useful field.

In some embodiments, during the data cleaning, incomplete records are directly removed, and duplicate records are merged into one piece; the data transformation is to carry out mathematical transformation for a directly extracted field to obtain required verification information.

In some embodiments, before training and optimizing the model, the sensor data of the system operation data of the intelligent vehicle in the normal running state is de-noised, and feature extraction and screening are performed for the fatal sensor fault of the system operation data of the intelligent vehicle in the normal running state.

In some embodiments, the feature extraction is performed for the system operation data of the intelligent vehicle in the normal running state at different scales using discrete wavelet transform (DWT); a signal from extracted features are reconstructed using an approximation coefficient and a detail coefficient to obtain de-noised system operation data; a signal of the system operation data of the intelligent vehicle in the normal running state is reconstructed using a threshold method.

In some embodiments, the feature extraction is performed for the system operation data of the intelligent vehicle in the normal running state at different scales using DWT, and a sliding window method is adopted for the DWT.

In some embodiments, the model comprises a plurality of subsystem models, and each of the subsystem models corresponds to an independent actuator.

In some embodiments, the fatal sensor fault is determined according to formulas (6) and (7):

$$th_{BM} < abs(\Sigma_{i=k-(W-1)}^{k} d_i) \qquad (6),$$

$$th_J > \Sigma_{i=k-W_J}^{k} abs(x(k)-x(i)) \qquad (7),$$

wherein, $th_{BM}$ and $th_J$ are two set thresholds and are set to be 3 and $1 \times 10^{-6}$ respectively; W and $W_J$ are sizes of two sliding windows and are set to be 100 and 50 respectively; $d_i$ represents a three-level detail coefficient obtained through DWT at moment i; x(k) represents the sensor data at moment k.

The present disclosure further provides a system for a fault diagnosis of an intelligent vehicle, comprising:

a state monitoring module for a sensor;

an abnormality detection module for the intelligent vehicle; and a fault test module for an actuator;

wherein the state monitoring module is configured to acquire system operation data of the intelligent vehicle in a running state and transmit the acquired system operation data to the abnormality detection module and the fault test module;

the fault test module is configured to:

determine the system operation data through screening; if a screened feature of the system operation data is a fatal sensor fault, output sensor unit information corresponding to the screened feature; and the abnormality detection module is configured to determine the system operation data; if system state data corresponding to the system operation data of the intelligent vehicle in the running state exceeds a set threshold, determine that an actuator corresponding to the system state data has a fault.

Compared to the prior art, the present invention has the following advantages.

A model of a system of the intelligent vehicle is established, and system operation data of the intelligent vehicle in a normal running state is acquired. The system operation data of the intelligent vehicle in a normal running state is adopted to train and optimize the model. The system operation data of the intelligent vehicle in a running state is collected in real time. Sensor data of the system operation data is de-noised, and feature extraction and screening are performed for a fatal sensor fault, to reconstruct the system operation data. If a screened feature is the fatal sensor fault, sensor unit information corresponding to the screened feature is outputted. The reconstructed system operation data is inputted into the trained model to output system state data of the intelligent vehicle in the running state. The system state data is compared with a set threshold. If the system state data exceeds the set threshold, an actuator corresponding to the system state data is determined to have a fault. Sensor data of the collected system operation data is de-noised, and features of a fatal sensor fault are extracted and screened, so that fatal abnormality of the sensor data and state abnormality of the vehicle can be effectively detected. The fault of the intelligent vehicle can be positioned according to the system operation data.

The DWT can be used for extracting features of the sensor fault and de-noising the sensor data, and the sliding window method can greatly improve the accuracy of the data.

The model includes a plurality of subsystem models, and each of the subsystem models corresponds to an independent actuator. In this way, the sensor data de-noising and the feature extraction and screening are performed for each independent subsystem, so that the subsystem having faults can be quickly screened out.

The state monitoring module is configured to acquire system operation data of the intelligent vehicle in a running state and transmit the acquired system operation data to the abnormality detection module and the fault test module. The fault test module is configured to screen the system operation data; and if a screened feature of the system operation data is a fatal sensor fault, output sensor unit information corresponding to the screened feature; and the abnormality detection module is configured to determine the system operation data; and if system state data corresponding to the system operation data of the intelligent vehicle in the running state exceeds a set threshold, determine that an actuator corresponding to the system state data has a fault. In this way, faults of the intelligent vehicles can be quickly diagnosed.

DETAILED DESCRIPTION OF EMBODIMENTS

The present disclosure will be further described below with reference to the accompany drawings.

Figure 1:
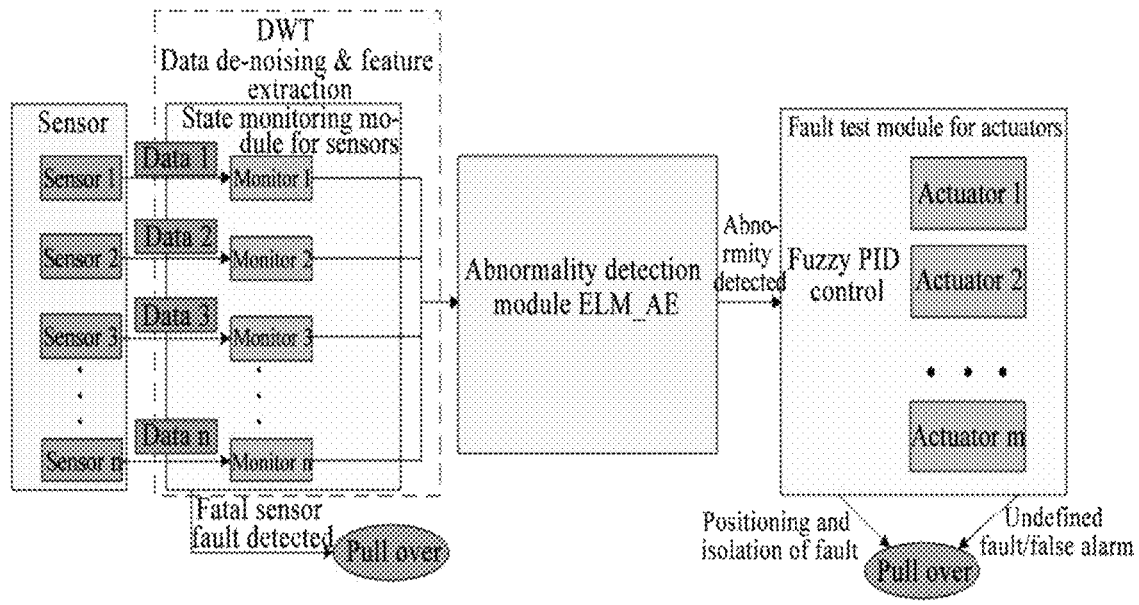
FIG. 1 is a schematic diagram of a system for a fault diagnosis of an intelligent vehicle according to an embodiment of the present disclosure.

As shown in FIG. 1, illustrated is a method for a fault diagnosis of an intelligent vehicle, including the following steps.

1) A model of a system of the intelligent vehicle is established. System operation data of the intelligent vehicle in a normal running state is obtained. The model is trained and optimized using the system operation data of the intelligent vehicle in the normal running state.

Specifically, the system operation data of the intelligent vehicle in the normal running state is obtained through a storage medium of a control system of the intelligent vehicle. A useful field in the system operation data is extracted, and data cleaning and data transformation are carried out for the useful field.

Specifically, during the data cleaning, incomplete records are directly removed, and duplicate records are merged into one piece of record. The data transformation is to carry out the mathematical transformation for the directly extracted field to obtain required verification information.

Before training and optimizing the model, sensor data of the system operation data of the intelligent vehicle in the normal running state is de-noised, and feature extraction and screening are performed for the fatal sensor fault of the system operation data of the intelligent vehicle in the normal running state, so as to eliminate optimization training defects of the model caused by the fatal sensor fault.

Specifically, feature extraction is performed for the acquired system operation data of the intelligent vehicle in the normal running state at different scales using DWT. Signals from the extracted features are reconstructed using approximation coefficients and detail coefficients to obtain the de-noised system operation data. The signal of the obtained system operation data of the intelligent vehicle in the normal running state is reconstructed using a threshold method.

2) The system operation data of the intelligent vehicle in the normal running state is collected in real time. The sensor data is de-noised, and feature extraction and screening are performed for the fatal sensor fault. If a screened feature is a fatal sensor fault, a sensor unit corresponding to the screened feature needs to be replaced. The reconstructed system operation data is inputted into the trained and optimized model to output state data of the system of the intelligent vehicle in the running state. The operation data of the intelligent vehicle in the running state is compared with a set threshold; if the operation data exceeds the set threshold, the system corresponding to the operation data is determined to have a fault and needs to be repaired. The model is trained and optimized using the system operation data of the intelligent vehicle in the normal running state, and the approximation is performed for the input and the corresponding output, so that the set threshold is obtained.

The model includes multiple subsystem models, and each subsystem model corresponds to an independent actuator of the intelligent vehicle.

Embodiment

In this embodiment, collected sensor data refers to GNSS information, and the actuator data refers to data of a hydraulic brake of the vehicle. The method for fault diagnoses of intelligent vehicles is described in detail as follows.

Figure 2:
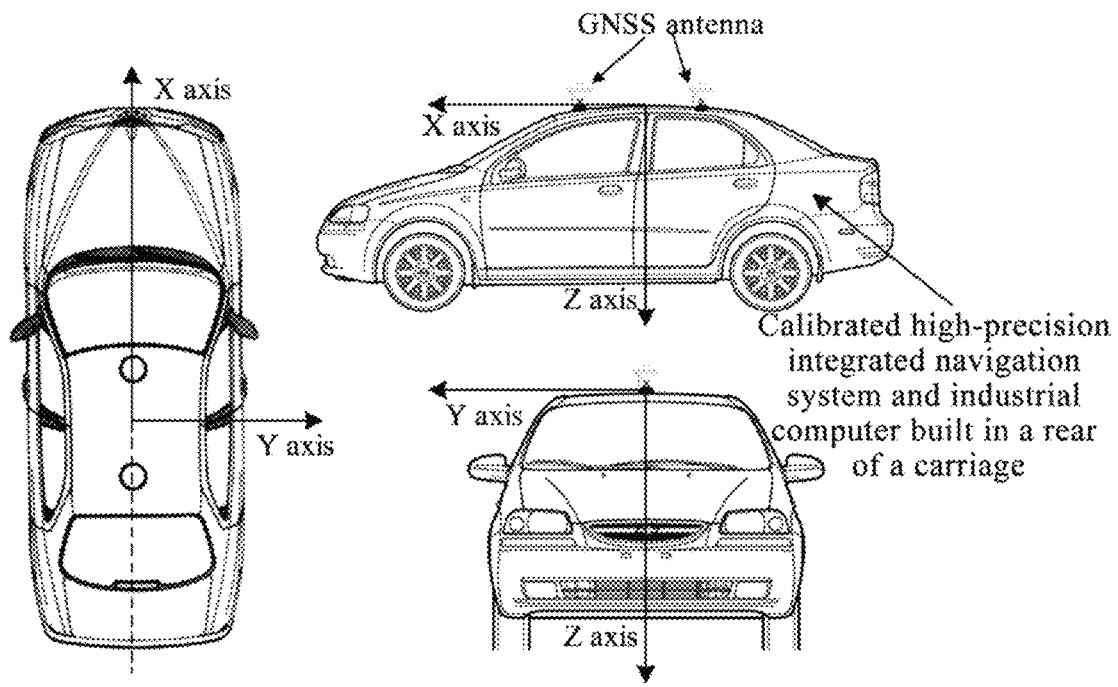
FIG. 2 shows the mounting of Global Navigation Satellite System (GNSS) antennas according to an embodiment of the present disclosure.

The collection of the operation data of the GNSS is described as follows. The data acquisition devices used include an integrated navigation system Micro Electro Mechanical System (MEMS) installed in the vehicle, a set of GNSS antennas for receiving satellite signals, an industrial computer for recording logs of the integrated navigation system GNSS, and a power supply device for powering the above devices. As shown in FIG. 2, the calibrated integrated navigation system and the industrial computer are placed at a rear of a carriage of the vehicle, and are connected to the GNSS antenna through feeder lines. The GNSS antennas are screwed onto two strong magnetic sucker disks and placed in forward and backward directions of the test carrier, respectively, so as to ensure that a good GNSS signal can be received. At the same time, the line formed by phase centers of the two GNSS antennas is consistent or parallel to a center axis of the test carrier.

The collection of the operation data of the hydraulic brake is described as follows. The operation data of the hydraulic brake includes an oil pressure of the vehicle, a vehicle speed and the time when the vehicle begins to brake and the time when the vehicle is fully stopped, and the data acquisition device used herein is a vehicle-mounted CAN bus analyzer. The CAN bus of the intelligent vehicle is connected to the vehicle-mounted CAN bus analyzer which is connected to the computer via a USB cable, so that relevant data of the vehicle can be obtained from the CAN bus.

Step 1) System operation data is extracted and pretreated.

The system operation data in this embodiment includes operation data of the GNSS and operation data of the hydraulic brake. Useful fields are extracted from the operation data of the GNSS and the operation data of the hydraulic brake, respectively, and data cleaning and data conversion are performed for the useful fields. The useful fields are used for training the model.

For the operation data of GNSS, the useful fields extracted include a protocol header, sampling moment, latitude, longitude, a heading angle, an eastward speed and a northward speed. For the collected operation data of the hydraulic brake, the extracted useful fields include an oil pressure of the vehicle, a vehicle speed and the time when the vehicle begins to brake and the time when the vehicle is fully stopped (i.e., the vehicle speed is 0). The extracted fields still have many problems including incomplete, missing, and duplicate records, and cannot be directly inputted to the model for training. The incomplete records are directly removed. The duplicate records are merged, and only one piece is kept. The input data required for subsequent training and verification of the model includes: the speed, an angular velocity and the oil pressure, the vehicle speed when the vehicle begins to brake and an average acceleration during braking of the vehicle in an unmanned state. Attribute cannot be obtained directly from the extracted fields, and is acquired through a certain transformation based on the extracted fields.

The transformation method includes the following steps.

(1) The eastward speed and the northward speed are transformed to obtain a speed value. The eastward speed is denoted as $v_e$ and the northward speed is denoted as $v_n$. The speed value is:

$$v=\sqrt{v_e^2+v_n^2} \qquad (1).$$

The angular velocity is obtained by calculating a difference quotient of the heading angles at two consecutive sampling moments. Considering that the heading angles of 360° and 0° actually represent the same heading angle, but the numerical value shows an abrupt change, the phase unwrap function of the MATLAB R2016a platform is used to avoid such abrupt change between two consecutive time frames, and then the difference quotient of heading angles is calculated. The angular velocity of the intelligent vehicle is calculated as follows:

$$\omega_k = \left| \frac{\varphi_k - \varphi_{k-1}}{t_k - t_{k-1}} \right|, \qquad (2)$$

where $\omega_k$ represents the angular velocity at moment k; $t_k$ and $t_{k-1}$ represent two consecutive sampling moments, $\varphi_k$ and $\varphi_{k-1}$ represent the heading angles at moments k and k−1, respectively.

3) The average acceleration a during braking is calculated from the vehicle speedy, and the moment $t_0$ when the vehicle begins to brake, and the moment $t_1$ when the vehicle is fully stopped:

$$\alpha = v_s/(t_1-t_0) \qquad (3).$$

Step 2) Sensor data is de-noised, and feature extraction and screening is performed for the fatal sensor fault.

Using the multi-resolution analysis of the DWT, the feature extraction of the operation data is performed at different scales. The approximation coefficients (also known as low-frequency coefficients) and the detail coefficients (also known as high-frequency coefficients) are adopted to reconstruct the signal, so as to obtain the de-noised operation data. The threshold method is used to reconstruct the signal of the system operation data of the intelligent vehicle in the normal running state, that is, the detail coefficients greater than the threshold are set to zero, and then the inverse wavelet transform is adopted to obtain the reconstructed signal. The threshold is selected based on an empirical formula:

$$th=std(x)\cdot\sqrt{2\log_2(N)} \qquad (4),$$

where, th is the determined threshold, std(x) is a standard deviation of a signal x, and N is a signal length. In practice, in order to facilitate the adjustment of the threshold, an adjustment coefficient α (usually around 1) is often added to the formula (4) to obtain:

$$th=\alpha\cdot std(x)\cdot\sqrt{2\log_2(N)} \qquad (5).$$

Figure 3A:
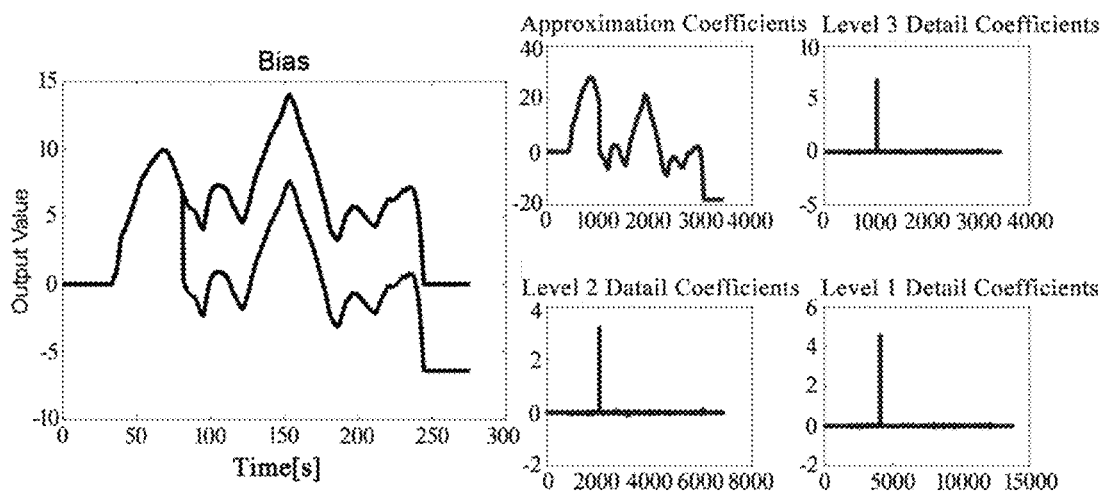
FIG. 3A is a schematic diagram of a bias signal decomposed by DWT according to an embodiment of the present disclosure.
Figure 3B:
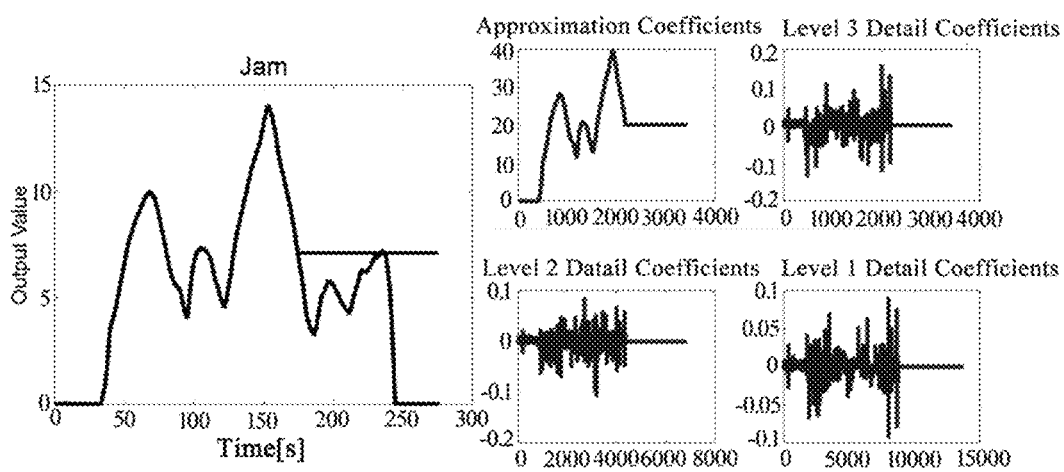
FIG. 3B is a schematic diagram of a jam signal decomposed by DWT according to an embodiment of the present disclosure.
Figure 3C:
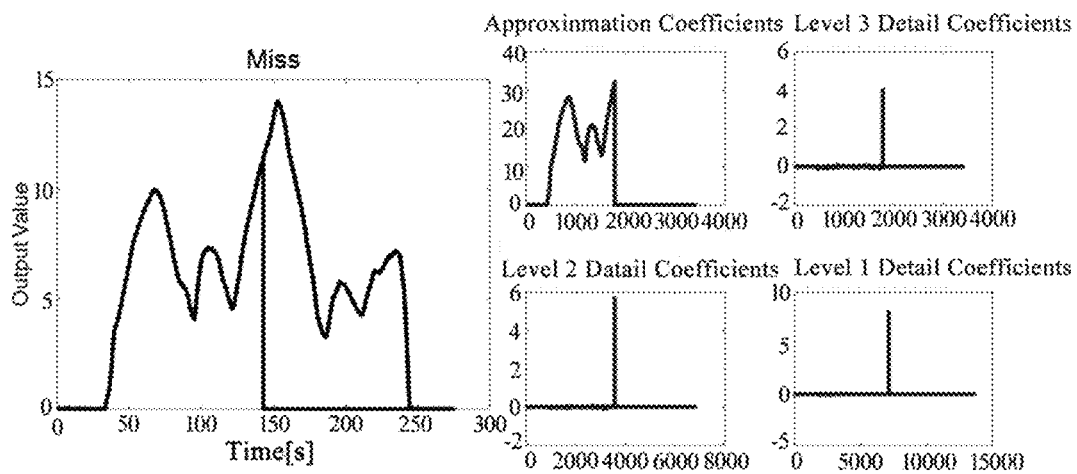
FIG. 3C is a schematic diagram of a frame miss signal decomposed by DWT according to an embodiment of the present disclosure.

The fatal sensor fault means that when the fault occurs, the sensor itself or related electronic devices (such as power supply) are in an abnormal state, for example, internal components are damaged and the power supply fails. Once the fatal sensor fault occurs, the sensor cannot work normally, and accordingly the intelligent vehicle cannot work since it cannot effectively perceive the environment. It is necessary to replace the corresponding sensor according to the fatal sensor fault. Common fatal faults include: bias (a fixed deviation from the actual value), jam (outputs of the sensor are a constant value), miss (lack of available data of the sensor in a period of time), and as shown in FIGS. 3A-C, relative features of these fatal faults can be extracted though the DWT. When the intelligent vehicle is in the running state, the sensor data arrives sequentially, so the sliding window mechanism is adopted when performing DWT, that is, only a certain length of data rather than all data is processed each time by DWT. The fatal sensor fault can be judged according to the following two formulas:

$$th_{BM} < abs(\Sigma_{i=k-(W-1)}^{k} d_i) \qquad (6),$$

$$th_J > \Sigma_{i=k-W_J}^{k} abs(x(k)-x(i)) \qquad (7),$$

where, $th_{BM}$ and $th_J$ are two set thresholds and are set to be 3 and $1 \times 10^{-6}$ respectively. W and $W_j$ are sizes of two sliding windows and are set to be 100 and 50 respectively. $d_i$ represents a three-level detail coefficient obtained through DWT at time i (the DWT decomposes the data at three levels). x(k) represents the sensor data at time k. If formula (6) is true, it means that a "bias" fault or a "miss" fault has been detected; if formula (7) is true, it means that a "jam" fault has been detected.

Step 3: An abnormality detection module of the vehicle is constructed, that is, a vehicle system model is constructed and trained as follows.

Based on an extreme learning framework, the speed and the angular velocity of the vehicle in normal running state obtained in step 1 are used to train an autoencoder. The trained autoencoder performs pattern comparison on new samples to identify data that clearly bias from the data in the normal running state.

Figure 4:
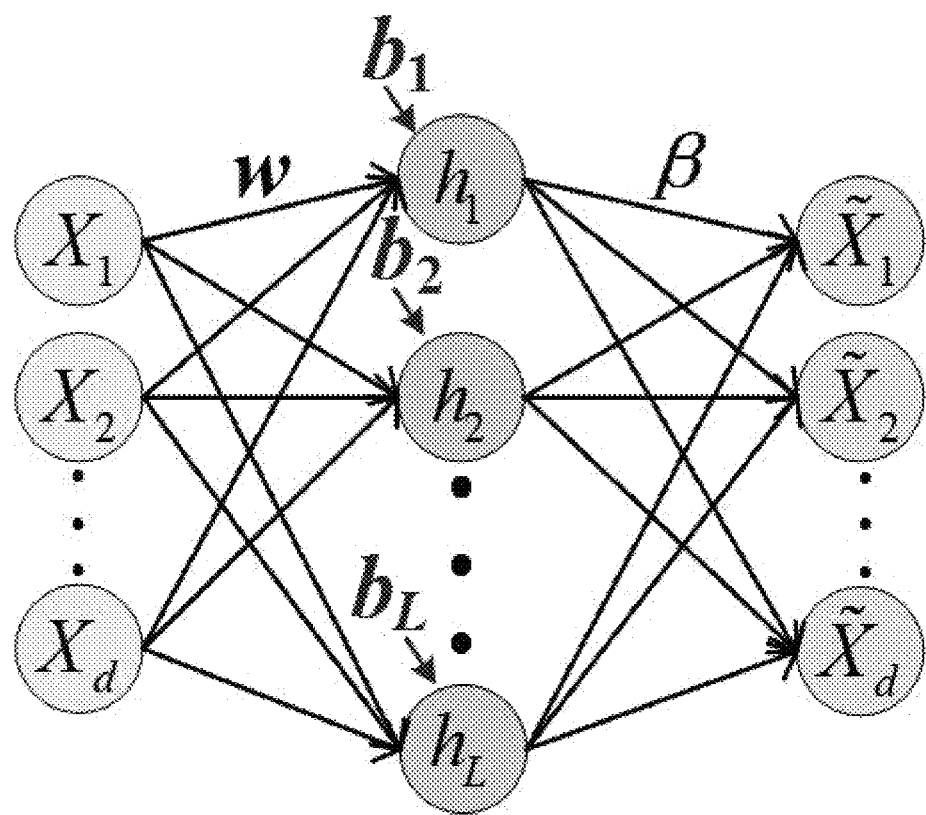
FIG. 4 is a schematic diagram of a neural network according to an embodiment of the present disclosure.

Step 3.1) The autoencoder is trained offline. The autoencoder, which is a neural network in structure, is the vehicle system model. As shown in FIG. 4, the encoding and decoding operations are described by equations (8) and (9), where w and b represent a weight matrix and a bias vector of the network in the vehicle system model, and g is an activation function. An input vector $X=[x_1, x_2, \ldots, x_d]^T$ is encoded into a form of $h=[h_1, h_2, \ldots, h_L]^T$, and then decoded into $\tilde{X}=[\tilde{x}_1, \tilde{x}_2, \ldots, \tilde{x}_d]^T$ by an output weight matrix β.

$$h_j = g(\Sigma_{i=1}^{d} w_{ji} x_i + b_j); j=1,2,\ldots,L \qquad (8),$$

$$\tilde{x}_k = \Sigma_{j=1}^{L} \beta_{jk} h_j; k=1,2,\ldots,d \qquad (9),$$

$$\varepsilon = \|X - \tilde{X}\| \qquad (10).$$

The feature of the autoencoder is that the input of the network is consistent with the target output (or label). The input data is reconstructed by minimizing the reconstruction error defined by equation (10), so that normal data can be learned. When training the vehicle system model, only health data (that is, the operation data of the system of the vehicle in the normal running state) is used as inputs and target outputs. After the vehicle system model is trained, if input data is similar to the training data (i.e., normal data), the vehicle system model reconstructs the input data well; otherwise, there is a large error between the actual input data and the reconstructed input data. According to the error between the actual input data and the reconstructed input data, whether the samples are abnormal is determined.

A hidden layer parameter β* of the extreme learning framework is directly calculated based on the least square method:

$$\beta^* = H^\dagger X \qquad (11),$$

where, $H=[h^T(x_1), \ldots, h^T(x_d)]^T$, $H^\dagger = (H^T H)^{-1} H^T$ is a Moore-Penrose generalized inverse of the matrix H. The output y of the vehicle system model is expressed as:

$$y = h\beta^* = hH^\dagger X \qquad (12).$$

Step 3.2) The state of the vehicle is detected. For the intelligent vehicle, the input vector X is described by the speed v and the angular velocity ω which represent the state of the vehicle at the time of sampling (the speed v represents the state of the vehicle in the longitudinal direction, and the angular velocity ω represents the state of the vehicle in the transverse direction). Whether the sample point is abnormal (different from the normal data pattern) can be judged by calculating the 2-norm of the output y of the vehicle system model, that is, for a new sample $X_{new}=[v_{new}, \omega_{new}]^T$, a decision variable can be formalized as:

$$D = sign(\delta - \|y - X_{new}\|) \qquad (13),$$

where, δ is a threshold value set according to the actual situation, where δ takes 5 herein; sign represents a sign function; D is the decision variable; if D is −1, the current state of the vehicle is considered to be significantly deviated from the normal state.

Step 4) Approximation is carried out for the system of the actuator. In this embodiment, the system of the hydraulic brake is taken an example to illustrate the approximation of the system of the actuator. A fully connected neural network with two hidden layers is built. Each hidden layer has 16 nodes, and the number of nodes in the input layer and the output layer is the same as the corresponding input and output dimensions. The oil pressure and the speed when the vehicle begins to brake obtained in step 1 are taken as the input data, and the average acceleration during braking is taken as the output data to train the fully connected neural network. The activation function adopts a rectified linear unit (ReLU), and the weight parameters and the bias parameters are initialized randomly at the beginning, and are continuously modified as the training process progresses. The training process involves back propagation (BP), and the BP process involves adaptive momentum (Adam); when an error between mean squares of the output of the vehicle system model and the actual value is less than 1e-3, the training is stopped.

Figure 5:
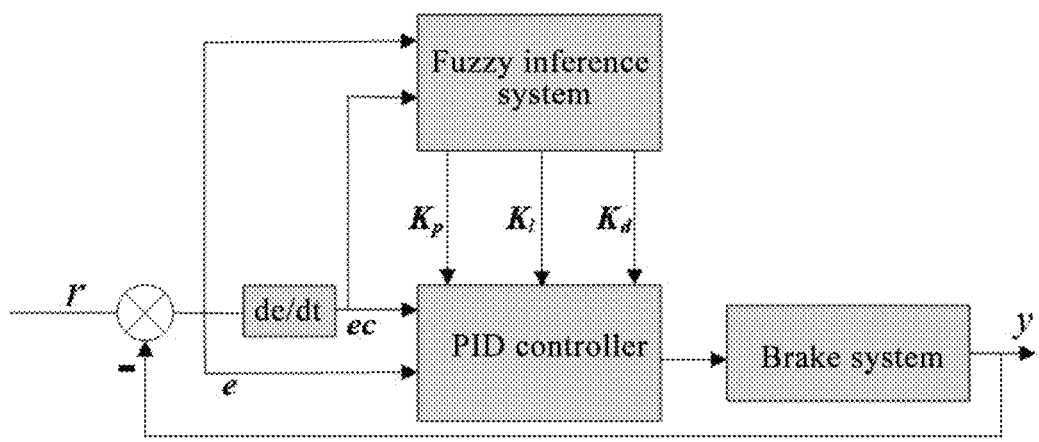
FIG. 5 is a schematic diagram of a two-dimensional fuzzy proportional-integral-differential (PID) controller according to an embodiment of the present disclosure.

Step 5) As shown in FIG. 5, a fuzzy PID controller is constructed. The fuzzy PID controller is a two-dimensional controller, and mainly composed of a PID controller and a fuzzy inference system. The fuzzy inference system takes the error e and the error rate ec of change as the input, and parameters of the PID controller are adjusted online according to the inference rule. The fuzzy set is defined as {NB, NM, NS, ZO, PS, PM, PB} which respectively represent negative big, negative medium, negative small, zero, positive small, positive medium, and positive large. Different independent actuators have different fuzzy rules. Based on relevant theories and practical experience of the brake system, the fuzzy rules of $K_p$, $K_i$, $K_d$ (Table 1-Table 3) of the brake system are given below.

TABLE 1

Fuzzy rule of $K_p$

| $K_p$ | | | | ec | | | |
|---|---|---|---|---|---|---|---|
| | NB | NM | NS | ZO | PS | PM | PB |
| e NB | PB | PB | PM | PM | PS | ZO | ZO |
| NM | PB | PB | PM | PS | PS | ZO | NS |
| NS | PM | PM | PM | PS | ZO | NS | NS |
| ZO | PM | PM | PS | ZO | NS | NM | NM |
| PS | PS | PS | ZO | NS | NS | NM | NM |
| PM | PS | ZO | NS | NM | NM | NM | NB |
| PB | ZO | ZO | NM | NM | NM | NB | NB |

TABLE 2

Fuzzy rule of $K_i$

| $K_i$ | | NB | NM | NS | ZO | PS | PM | PB |
|---|---|---|---|---|---|---|---|---|
| | | | | | ec | | | |
| e | NB | NB | NM | NM | NM | NS | ZO | ZO |
| | NM | NB | NB | NM | NS | NS | ZO | ZO |
| | NS | NB | NM | NS | NS | ZO | PS | PS |
| | ZO | NM | NM | NS | ZO | PS | PM | PM |
| | PS | NM | NM | ZO | PS | PS | PM | PB |
| | PM | ZO | ZO | PS | PS | PM | PB | PB |
| | PB | ZO | ZO | PS | PM | PM | PB | PB |

TABLE 3

Fuzzy rule of $K_d$

| $K_d$ | | NB | NM | NS | ZO | PS | PM | PB |
|---|---|---|---|---|---|---|---|---|
| | | | | | ec | | | |
| e | NB | PS | NS | NB | NB | NB | NM | PS |
| | NM | PS | NS | NB | NM | NM | NS | ZO |
| | NS | ZO | NS | NM | NM | NS | NS | ZO |
| | ZO | ZO | NS | NS | NS | NS | NS | ZO |
| | PS | ZO | ZO | ZO | ZO | ZO | ZO | ZO |
| | PM | PB | PS | PS | PS | PS | PS | PB |
| | PB | PB | PM | PM | PM | PM | PS | PB |

After the fuzzy rules are determined, the membership function should be selected according to the actual situation, and may cause a greater impact on the performance of the fuzzy PID controller. Generally, if there is a higher requirement for the response sensitivity of the system, a membership function with a sharper shape may be selected; otherwise, a membership function with a smoother shape may be selected. In this embodiment, the triangular membership function is selected, and the inference rule is the Mamdani fuzzy inference rule. Finally, the three parameters $K_p$, $K_i$, $K_d$ of the PID controller are obtained through the center of gravity defuzzification method.

Figure 6:
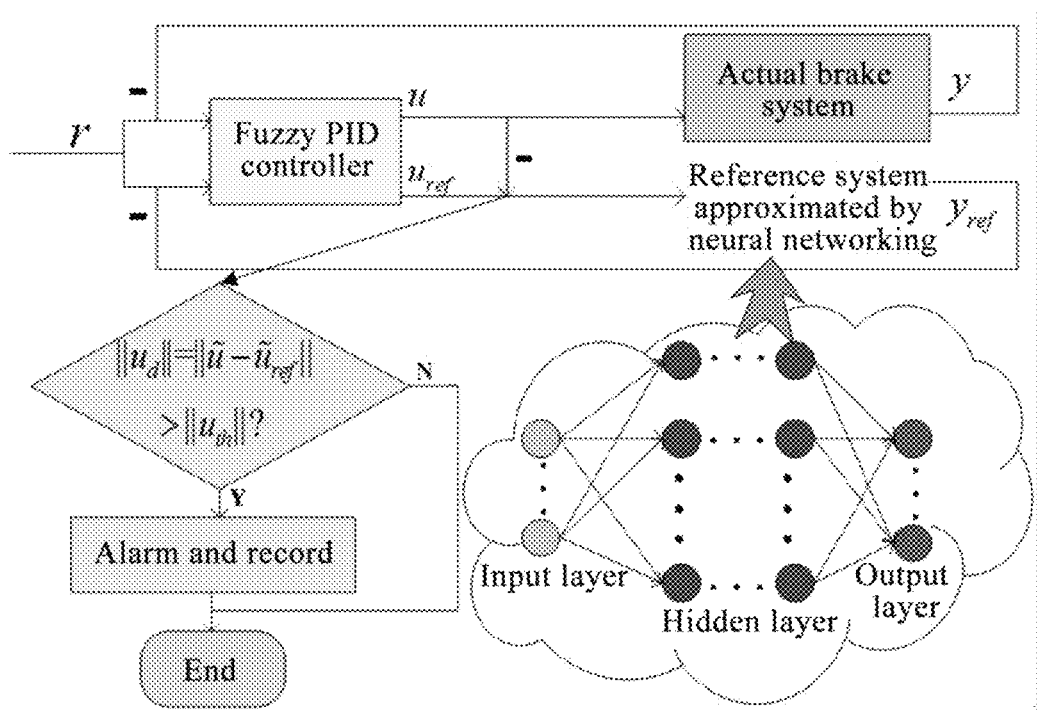
FIG. 6 is a flow scheme of a method for a fault diagnosis of the intelligent vehicle according to an embodiment of the present disclosure.

Step 6) The fault of the actuator is positioned. For each actuator in a healthy state, a neural network is used to approximate its input and output relationship. After training, the neural network will be used as the reference system of the actual actuator unit. The controller acts on the actual actuator and the reference system at the same time. If the actual system fails, there is a large bias between the actual output and the output of the system in the normal running state. In order to allow a controlled object to achieve a desired performance, the output of the controller will have a larger change from the output in the normal running state. That is, once a fault occurs, there is a large difference between the output of the controller for the actual actuator and the output of the controller for the reference system. Taking the brake system as an example, as shown in FIG. 6, the input of the controller is the error and the error rate of change between the output y of the actuator and the reference input r, and the output u of the controller is generated. At the same time, the error and error change rate of the output $y_{ref}$ of the reference system and the reference input r are also used as the input of the controller at the same time to generate a reference output $u_{ref}$ of the controller. If the actuator is abnormal, that is, the performance (or output) is not up to the expectation, there is a significant difference between u and $u_{ref}$. A derivation $u_d$ is defined as:

$$u_d = \|\tilde{u} - \tilde{u}_{ref}\| \tag{14}$$

where, $\tilde{u}$ and $\tilde{u}_{ref}$ are standardized u and $u_{ref}$ respectively; $\|\cdot\|$ is a certain norm and takes the 2-norm herein. If $u_d$ is greater than the threshold $u_{th}$, the actuator is abnormal, and the system will alarm and record the abnormal information of this specific actuator in the log. After the fault is located, the vehicle slows down and pulls to the side to stop for subsequent processing.

According to the steps 4 and 5, for the fuzzy PID controller, three components of the output $u=[K_p, K_i, K_d]^T$ are normalized to the interval [0,1] to obtain $\tilde{u}$. Similarly, the output $u_{ref}$ of the reference system is normalized to obtain $\tilde{u}_{ref}$. The 2-norm is calculated after the subtraction of the respective components of $\tilde{u}$ and $\tilde{u}_{ref}$. The 2-norm is compared with the set threshold $u_{th}$. In this embodiment, the set threshold is 2. If it is greater than the threshold, the fault may occur in the system of the actual brake. Then, the fault is recorded in the log, and an alarm is issued.

What is claimed is:

1. A method for a fault diagnosis of an intelligent vehicle, comprising:
   1) establishing a model of a system of the intelligent vehicle; acquiring system operation data of the intelligent vehicle in a normal running state; training and optimizing the model using the system operation data of the intelligent vehicle in the normal running state; wherein, before training and optimizing the model, the sensor data of the system operation data of the intelligent vehicle in the normal running state is de-noised, and feature extraction and screening are performed for a fatal sensor fault of the system operation data of the intelligent vehicle in the normal running state;
   2) collecting system operation data of the intelligent vehicle in a running state in real time; de-noising sensor data of the system operation data of the intelligent vehicle in the running state, and performing feature extraction and screening for a fatal sensor fault to reconstruct the system operation data of the intelligent vehicle in the running state; inputting the reconstructed system operation data into the trained model to output system state data of the intelligent vehicle in the running state; comparing the system state data with a set threshold; and if the system state data exceeds the set threshold, determining that an actuator corresponding to the system state data has a fault, thereby completing the fault diagnosis of the intelligent vehicle;
   wherein in step 1) and in step 2), the fatal sensor fault is determined according to formulas (6) and (7):

$$th_{BM} < abs(\Sigma_{i=k-(W-1)}^{k} d_i) \tag{6}$$

$$th_J > \Sigma_{i=k-W_J}^{k} abs(x(k)-x(i)) \tag{7}$$

wherein, $th_{BM}$ and $th_J$ are two set thresholds and are set to be 3 and $1 \times 10^{-6}$ respectively; W and $W_J$ are sizes of two sliding windows and are set to be 100 and 50 respectively; $d_i$ represents a three-level detail coefficient obtained through DWT at moment i; and x(k) represents the sensor data at moment k.

2. The method of claim 1, wherein the system operation data of the intelligent vehicle in the normal running state is obtained through a storage medium of a control system of the intelligent vehicle; and a useful field in the system operation data is extracted, and data cleaning and data transformation are carried out for the useful field.

3. The method of claim 2, wherein during the data cleaning, incomplete records are directly removed, and duplicate records are merged into one piece; the data transformation is to carry out mathematical transformation for a directly extracted field to obtain required verification information.

4. The method of claim 1, wherein the feature extraction is performed for the system operation data of the intelligent vehicle in the normal running state at different scales using discrete wavelet transform (DWT); a signal from extracted features are reconstructed using an approximation coefficient and a detail coefficient to obtain de-noised operation data; and a signal of the system operation data of the intelligent vehicle in the normal running state is reconstructed using a threshold method.

5. The method of claim 1, wherein the feature extraction is performed for the system operation data of the intelligent vehicle in the normal running state at different scales using DWT, and a sliding window method is adopted for the DWT.

6. The method of claim 1, wherein the model comprises a plurality of subsystem models, and each of the subsystem models corresponds to an independent actuator.

* * * * *